(12) United States Patent
Roche

(10) Patent No.: US 7,069,404 B1
(45) Date of Patent: Jun. 27, 2006

(54) MICROPROCESSOR WITH PROTECTION CIRCUITS TO SECURE THE ACCESS TO ITS REGISTERS

(75) Inventor: Franck Roche, Trets (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 09/479,105

(22) Filed: Jan. 7, 2000

(30) Foreign Application Priority Data

Jan. 11, 1999 (FR) .................................... 99 00301

(51) Int. Cl.
*G06F 12/00* (2006.01)

(52) U.S. Cl. ...................... 711/164; 711/163; 713/193; 726/30

(58) Field of Classification Search ................ 713/200, 713/193; 711/163, 164; 726/30
See application file for complete search history.

(56) References Cited

U.S. PATENT DOCUMENTS

| | | | | |
|---|---|---|---|---|
| 5,027,317 A | * | 6/1991 | Pepera et al. ................ 711/163 |
| 5,138,706 A | * | 8/1992 | Melo et al. .................... 703/27 |
| 5,222,001 A | * | 6/1993 | Tokumatsu et al. ........... 360/32 |
| 5,377,264 A | * | 12/1994 | Lee et al. .................... 713/189 |
| 5,522,086 A | * | 5/1996 | Burton et al. ................. 710/9 |
| 5,594,793 A | * | 1/1997 | Bahout ........................ 713/193 |
| 5,680,581 A | * | 10/1997 | Banno et al. .................. 710/38 |
| 5,778,199 A | * | 7/1998 | Wanner et al. .............. 710/107 |
| 6,034,889 A | * | 3/2000 | Mani et al. ............. 365/185.04 |
| 6,295,590 B1 | * | 9/2001 | Marumoto .................... 711/164 |
| 6,363,463 B1 | * | 3/2002 | Mattison .................... 711/164 |
| 6,654,847 B1 | * | 11/2003 | Roohparvar et al. ........ 711/103 |

FOREIGN PATENT DOCUMENTS

| EP | 0 651 394 A1 | 5/1995 |
| GB | 2 070 821 A | 9/1981 |
| GB | 2246457 A | * 7/1990 |

* cited by examiner

*Primary Examiner*—Ayaz Sheikh
*Assistant Examiner*—Kaveh Abrishamkar
(74) *Attorney, Agent, or Firm*—Lisa K. Jorgenson; Allen, Dyer, Doppelt, Milbrath & Gilchrist, P.A.

(57) ABSTRACT

A microprocessor is provided with protection circuits to secure access to its registers. The microprocessor includes a plurality of protection circuits, each associated with a register of the microprocessor. The protection circuits automatically block selection of the registers after each resetting of the microprocessor. The releasing of a protection circuit associated with a register is done by the successive sending, on the data bus, of N passwords proper to the register during N first operations for the selection of the register with $N \geq 1$. The selection of the register is effective only for the subsequent operations for selection of the register up to the next resetting of the microprocessor.

33 Claims, 3 Drawing Sheets

MICROPROCESSOR WITH PROTECTION CIRCUITS TO SECURE THE ACCESS TO ITS REGISTERS

FIELD OF THE INVENTION

The present invention relates to microprocessors, and, more particularly, to a microprocessor provided with protection circuits designed to secure access to the registers of the microprocessor.

BACKGROUND OF THE INVENTION

A register in a microprocessor is generally selected as follows. The control unit of the microprocessor generates the address of the register to be selected and applies it to the address bus of the microprocessor. This address is transmitted to an address decoder which then selects the register relating to the address by activating the selection input of this register. The register can then be read or its contents can be modified. This register is, for example, an address register or an instruction register.

It sometimes happens that the contents of the registers of the microprocessor are accidentally modified when a mistake is made, or when there is a malfunction of the system in the microprocessor, especially during the initialization of the microprocessor.

SUMMARY OF THE INVENTION

An object of the invention is to provide a microprocessor that ensures secured access to its registers.

According to the invention, it is planned, after each initialization of the microprocessor, to prevent any access to the registers of this microprocessor and to permit access to a register only if a password proper to this register has been presented at the data bus of the microprocessor during the first operation of selection of this register.

The microprocessor comprises an address bus, a data bus, a plurality of read accessible and write accessible registers, and an address decoder to select the registers as a function of the address present in the address bus.

The microprocessor furthermore comprises a plurality of protection circuits each associated with a register of the microprocessor to secure the access to the register. The protection circuits automatically block selection of the registers after each resetting of the microprocessor. The releasing of a protection circuit associated with a microprocessor register is done by the successive sending, on the data bus, of N passwords proper to the register during N first operations for the selection of the register with N≧1. The selection of the register is effective only for the subsequent operations for the selection of the register up to the following resetting of the microprocessor.

As needed, the protection circuit may block the selection of the associated register during operations of read access and write access to this register, or only during write access operations. During the N first operations for the selection of the associated register, each protection circuit compares the N data elements present in the data bus with the N passwords proper to the associated register. Each protection circuit gets released for the subsequent operations of selection of the register up to the next resetting of the microprocessor if the N data elements correspond to the N passwords.

In one embodiment, only one password (N=1) is planned per register. The protection circuit then comprises a comparator circuit for the comparison, during the first operation of selection of the associated register, of the data element present in the data bus with the password proper to the register and for the delivery of an output signal representing the result of the comparison. First means hold the output signal in the protection circuit until the following resetting of the microprocessor. Second means permit the selection of the register for the subsequent selection operations of the register if the output signal indicates that the data present in the data bus of the microprocessor during the first operation of selection of the register corresponds to the password associated with the register.

BRIEF DESCRIPTION OF THE DRAWINGS

Other features and advantages of the invention shall appear from the following detailed description made with reference to the appended drawings, of which.

DETAILED DESCRIPTION OF THE PREFERRED EMBODIMENTS

Figure 1:
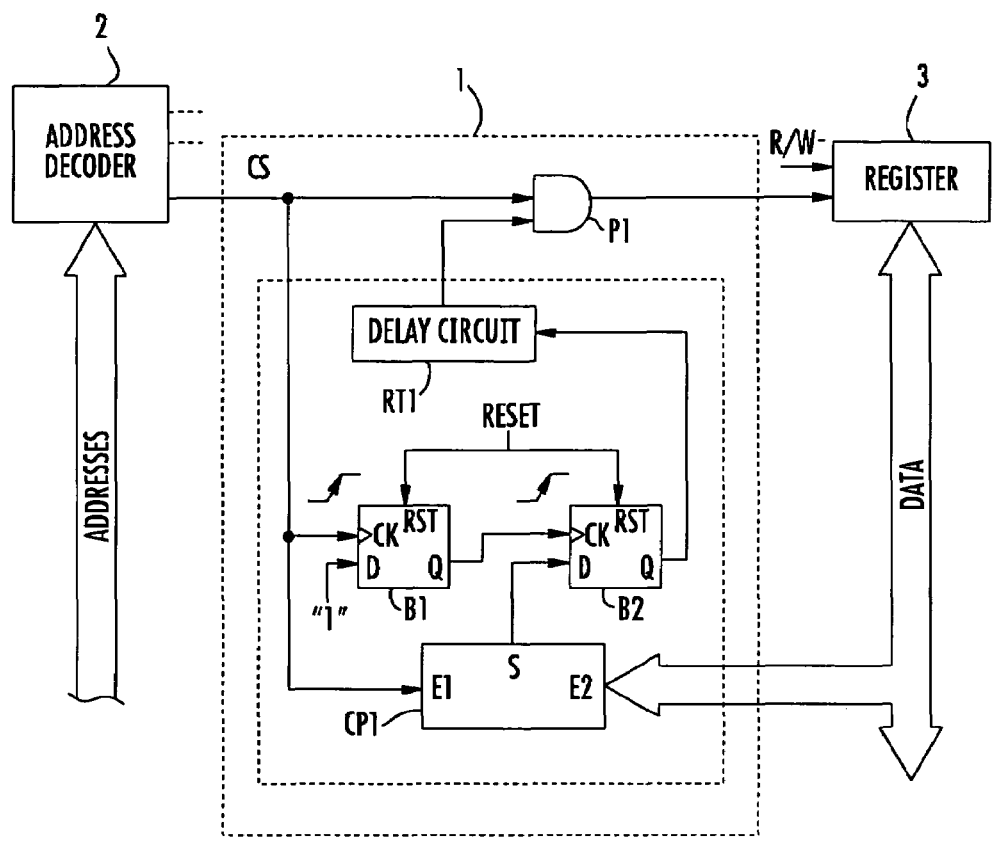
FIG. 1 shows a first embodiment of a protection circuit according to the present invention to secure read access and write access to a register.

The registers referred to hereinafter in the description comprise a selection input, a read/write input to which a read/write signal R/W- is applied and a data input/output connected to the data bus of the microprocessor. To implement the invention, a microprocessor, a portion of which is shown in FIG. 1, is provided with a protection circuit 1 to secure access to a register 3.

This protection circuit is interposed between the output of an address decoder 2 responsible for selecting the register 3 and the selection input of the register 3. The output of the decoder delivers a selection signal CS. According to the invention, one protection circuit per register is provided.

According to the invention, the protection circuit 1 is designed to automatically block the transmission of the selection signal CS after each resetting of the microprocessor. The protection circuit 1 is then released by the sending of a password proper to the register 3 on the data bus of the microprocessor during the first operation to select the register 3. The sending of a password on the data bus and the operation of selecting the register 3 are implemented, for example, during a cycle for writing the password in the register 3.

The first selection operation is used to release the protection circuit 1. The selection of the register 3 is effective only for the subsequent operations of selection of the register, up to the following resetting of the microprocessor. In the embodiment shown in FIG. 1, the protection circuit 1 blocks the selection of the register 3 during the operations of read and write access to the register 3 after each resetting. According to one embodiment shown in FIG. 2, the protection circuit blocks the selection of the register 3 only during operations of write access to the register 3.

Referring to FIG. 1, the protection circuit essentially has a comparator circuit CP1 for the comparison, during the first operation for the selection of the register 3, of the data present on the data bus of the microprocessor with the password proper to the register 3. The comparator circuit CP1 delivers an output signal representing the result of the signal. The protection circuit also holds the output signal in the protection circuit up to the following resetting of the microprocessor. Finally, the protection circuit permits selection of the register for the subsequent operations for selecting the register if the output signal indicates that the data element present on the data bus of the register during the first operation for the selection of the register corresponds to the password associated with the register 3.

The comparator circuit CP1 has a selection input E1 connected to the output of the address decoder. This selection input E1 is responsible for selecting the register 3. The comparator CP1 comprises a data input E2 to receive the data present on the data bus and an output S delivering a value representing the result of the comparison between the data element on the data bus and the password associated with the register 3.

At its output S, it delivers a logic 1 if the two data elements are equal. Otherwise, it delivers a logic 0. The structure of a circuit of this kind is well known to those skilled in the art. The password associated with the register 3 may be either stored permanently in the comparator circuit CP1 or given by an external peripheral device (not shown).

The result of a logic 1 or 0 of this comparison is held in the protection circuit 1 up to the following resetting of the microprocessor by two D type flip-flop circuits, B1 and B2, each having a clock input CK, a signal input D, a resetting input RST and a signal output Q.

The clock input CK and the signal input D of the flip-flop circuit B1 respectively receive the selection signal CS and a logic 1. The signal input D is, for example, connected to a power supply source of the microprocessor. The signal output Q of this flip-flop circuit is connected to the clock input CK of the flip-flop circuit B2. The signal input D of the flip-flop circuit B2 is connected to the output S of the comparator circuit CP1. A resetting signal RESET is applied to the inputs RST of the flip-flop circuits B1 and B2 at each resetting of the microprocessor.

During the first operation for the selection of the register 3, the selection of the register 3 is effective only to prevent the password present on the data bus during this operation from being written in the register 3. Hence, in order that the selection of the register 3 may be permitted only from the second selection operation of the register 3 onwards, the Q output of the flip-flop circuit B2 is connected through a delay circuit RT1 to a first input of a two-input AND logic gate P1. The second input of the gate P1 is connected to the output of the address decoder 2, which is responsible for selecting the register 3. The output of the gate P1 is connected to the selection input of the register 3. The delay circuit RT1 is preferably a shift register synchronized with the selection signal CS.

The protection circuit works as follows. At each resetting of the microprocessor, the flip-flop circuits B1 and B2 are reset. During the first operation for the selection of the register 3, the protection circuit 1 compares the data element present at the data output of the microprocessor with the password associated with the register 3. During this operation, the Q output of the flip-flop circuit B1 goes to a logic 1 and, on the resultant leading edge of the signal coming from this output, the Q output of the flip-flop circuit B2 delivers the result of the comparison. This result is then applied to the first input of the gate P1 with a delay to prevent the data element present on the data bus from being written in the register 3 during this first operation.

If the delay circuit RT1 is a shift register synchronized with the signal CS, the result of the comparison is applied to the first input of the gate P1 only starting with the second operation for the selection of the register 3. The password associated with the register 3 is preferably a data element not usually planned in the program of the microprocessor. This prevents the protection circuit from being accidentally released.

Figure 2:
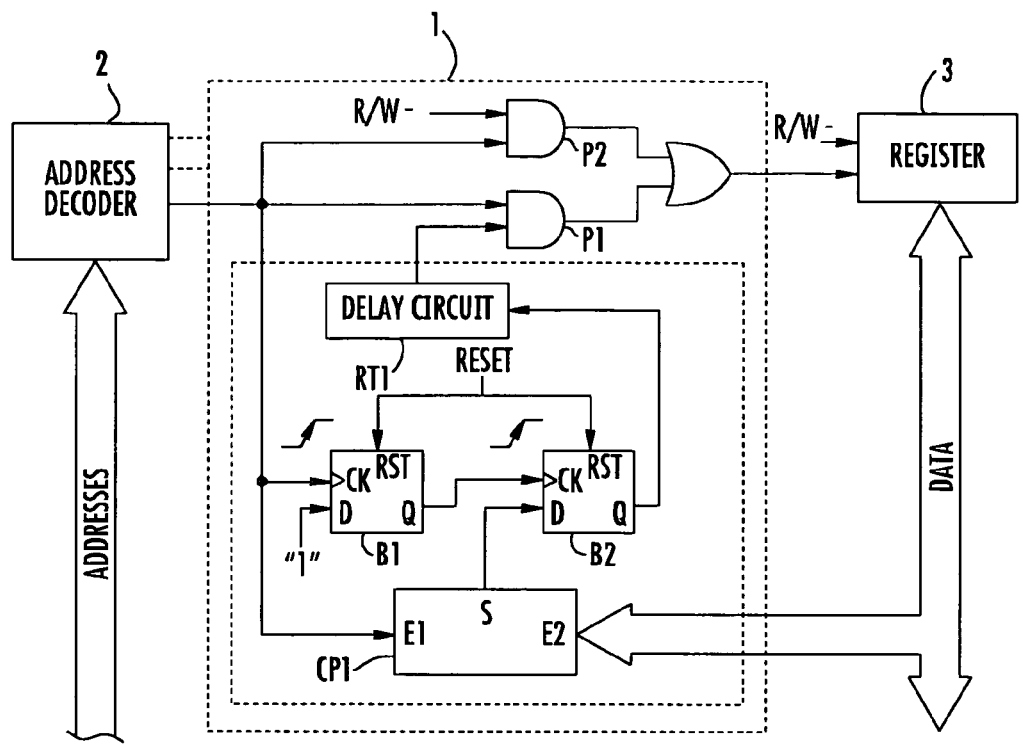
FIG. 2 shows a second embodiment of a protection circuit according to the present invention to secure write access to a register.

In a second embodiment shown in FIG. 2, the protection circuit is designed to secure only the write access of the register 3. The read access of the register 3 is never blocked. The releasing of the protection circuit, however, must be done during the first operation for the selection of the register as in the protection circuit of FIG. 1.

Referring to FIG. 2, the protection circuit 1 is complemented by a second two-input AND logic gate P2 and one two-input OR logic gate. The gate P2 has a first input connected to the output of the decoder 2 responsible for selecting the register 3 and a second input to which the read/write signal R/W- is applied. The outputs of the gates P1 and P2 are each connected to an input of the OR gate, and the output of the OR gate is connected to the selection input of the register 3. Thus, the register 3 can be read at any time even if the protection circuit 1 is off.

In the case of an 8-bit microprocessor, there is a probability of 1/256 ($256=2^8$) that the data present on the data bus during the first register 3 selection operation caused by a malfunctioning of the system will be the password associated with the register 3. To reduce this probability, it is proposed, as a variation, to combine the protection circuits of several registers with each other. This embodiment is shown in FIG. 3.

Figure 3:
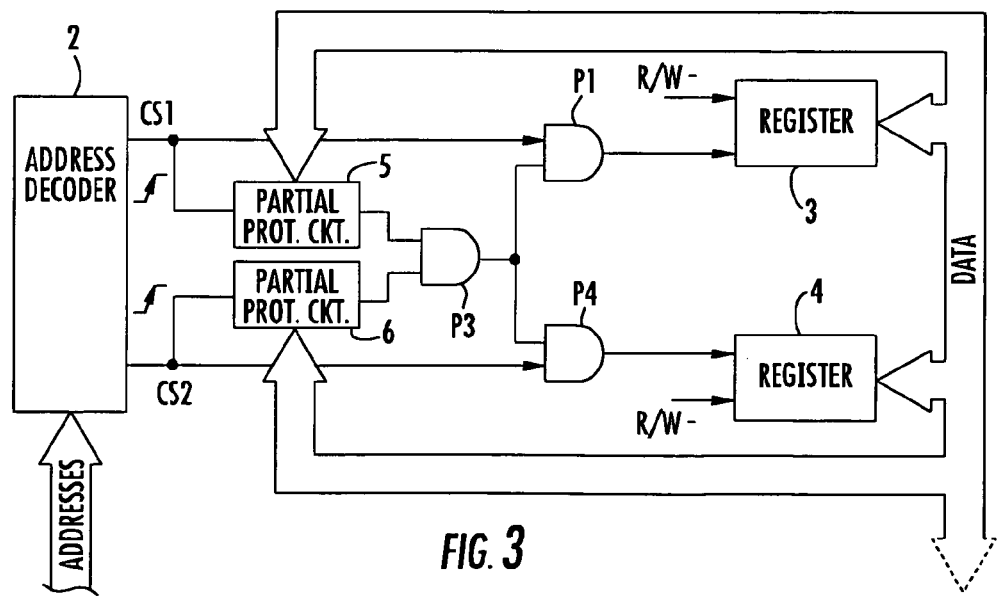
FIG. 3 shows a variation of the present invention by combining two protection circuits jointly securing access to two registers.

In the example of FIG. 3, the protection circuits of two registers are combined to secure their access. In this example, the address decoder is responsible for selecting registers of the microprocessor, especially two registers 3 and 4. The elements B1, B2, CP1 and RT1 of the protection circuit 1 of FIG. 1 are combined in a block 5. A two-input AND logic gate P3 is interposed between the output of the block 5 and the first input of the gate P1. The output of the block 5 corresponds to the output of the delay circuit RT1. The output of the decoder 2 responsible for selecting the register 3 is connected to the input of the block 5 and to the second input of the gate P1.

A block 6, identical to the block 5, and an AND logic gate P4 form the protection circuit of the register 4 as described in FIG. 1. The comparator circuit of the block 6 is responsible for comparing the data element present on the data bus with a password associated with the register 4, distinct from the one associated with the register 3. The output of the block 6 is connected to a second input of the gate P3. The output of the decoder 2 responsible for selecting the register 4 is connected to the input of the block 6 and to the second input of the gate P4.

To obtain access to the registers 3 and 4, the operation for the releasing of the protection circuit of FIG. 3 includes obtaining a write access to each register by applying the corresponding password to the data bus. These two write access operations must be performed during the first selection of the register 3 and during the first selection of the register 4. The register 3 can be selected before or after the register 4.

Figure 4:
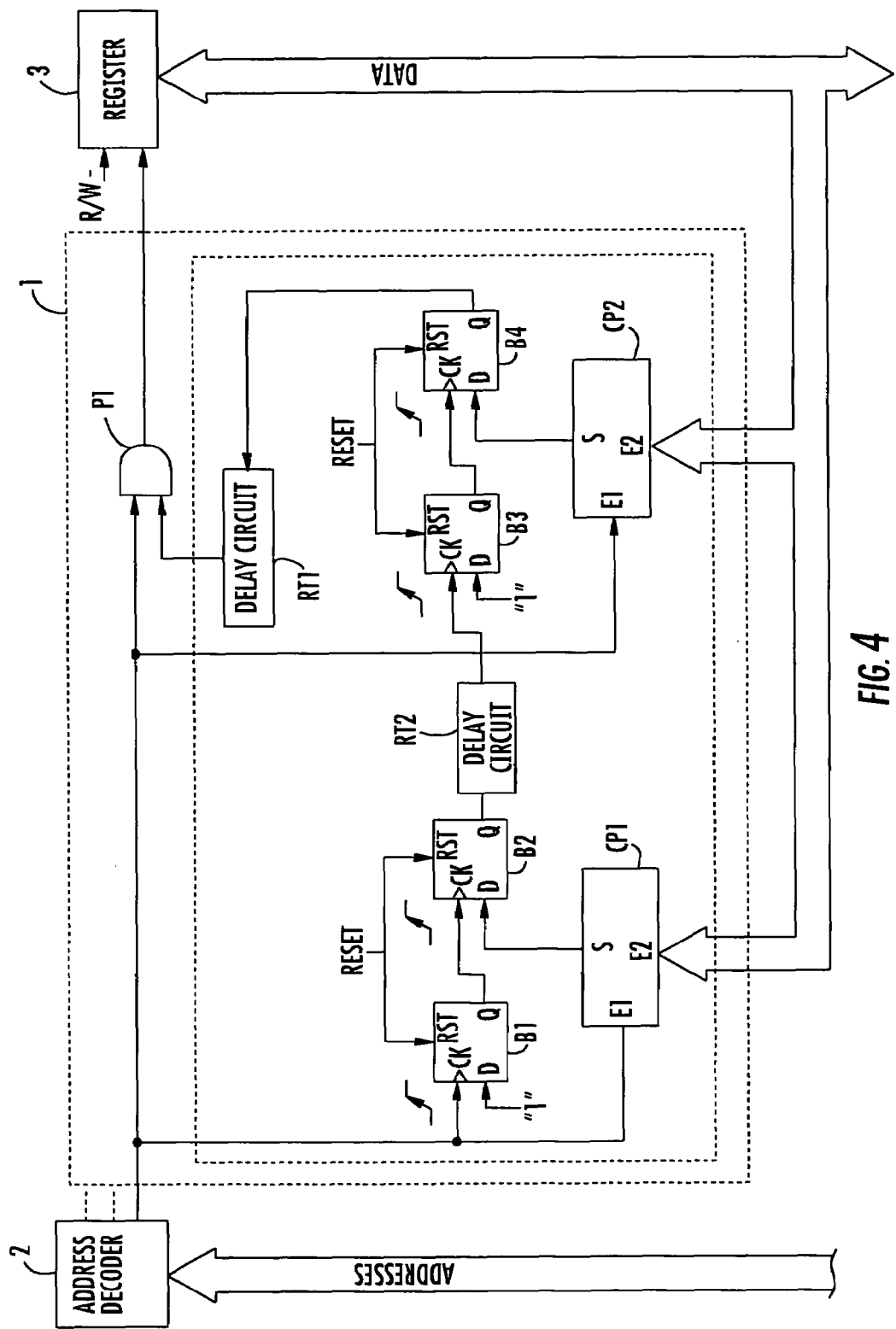
FIG. 4 shows a third embodiment of a protection circuit according to the present invention to secure read and write access to a register.

To further reduce this probability, a third embodiment of the protection circuit 1 is illustrated in FIG. 4. Access to the register 3 is secured by two passwords. These two passwords have to be placed on the data bus in a given order. For implementation of this protection circuit, the protection circuit of FIG. 1 is supplemented by two additional cascade-connected D type flip-flop circuits, B3 and B4, a second comparator circuit CP2 and a second delay circuit RT2. The clock input CK of the flip-flop circuit B3 is connected to the Q output of the flip-flop circuit B2 by a second delay circuit RT2. A logic 1 is applied to the D input of the flip-flop circuit B2, and its Q output is connected to the clock input CK of the flip-flop circuit B4.

The data input E2 of the comparator circuit CP2 is connected to the data bus, and its selection input E1 is connected to the output of the address decoder responsible for selecting the register 3. The S output of the comparator CP2 is connected to the D input of the flip-flop circuit B4, and the Q output of the flip-flop circuit B4 is connected to the delay circuit RT1. The two delay circuits are synchronized on the selection signal CS. The comparators CP1 and CP2 have the task, respectively, during the first and second operations for selecting the register 3, of comparing the data element present on the data bus with the first password and second password of the register 3.

To release this protection circuit, it is necessary not only to give the two passwords associated with the register 3 on the data bus, but to give them in the right order. The security of the access to the registers of the microprocessor is thereby improved. It is possible to further improve the security of the system by increasing the number of passwords associated with each register.

The invention claimed is:

1. A microprocessor comprising:
an address bus;
a data bus;
a plurality of read and write accessible registers connected to said data bus;
an address decoder connected to said address bus for selecting said plurality of registers as a function of an address provided by said address bus; and
a plurality of protection circuits connected between said address decoder and said plurality of registers, each protection circuit associated with a register to secure access thereto by blocking selection of said register after each resetting of the microprocessor, and releasing of said protection circuit by a successive sending on said data bus of N passwords proper to said register during N first operations for selection of said register with N≧1, the selection of said associated register being effective only for subsequent operations for the selection thereof until a next resetting of the microprocessor.

2. A microprocessor according to claim 1, wherein each protection circuit is arranged to block the selection of said associated register during read and write access operations to said associated register after each resetting of the microprocessor.

3. A microprocessor according to claim 1, wherein each protection circuit is arranged to block the selection of said associated register during write access operations to said associated register after each resetting of the microprocessor.

4. A microprocessor according to claim 1, wherein each protection circuit is connected between an output of said address decoder and a selection input of said associated register for selection thereof.

5. A microprocessor according to claim 1, wherein each protection circuit, during the N first operations for the selection of said associated register, compares N data elements present on said data bus with the N passwords proper to said associated register, and each protection circuit is released for subsequent operations of selection of said associated register until the next resetting of the microprocessor if the N data elements correspond to the N passwords.

6. A microprocessor according to claim 1, wherein a single password is provided for each register; and wherein each protection circuit comprises:
a comparator circuit for comparing, during a first operation for the selection of said register, a data element present on said data bus with the password proper to said register and for delivery of an output signal representing a result of the comparison;
first means for holding in each protection circuit the output signal until the next resetting of the microprocessor; and
second means permitting the selection of said register if the output signal indicates that the data present on said data bus during the first operation of selection of said register corresponds to the password associated with said register.

7. A microprocessor according to claim 6, wherein said first means comprises first and second D type flip-flop circuits, each flip-flop circuit having a clock input, a signal input, a resetting input to which a signal for resetting the microprocessor is applied, and an output;
said first flip-flop circuit having the clock input connected to the output of said address decoder responsible for selecting said register associated with said protection circuit, and the signal input for receiving a signal corresponding to a logic signal; and
said second flip-flop circuit having the clock input connected to the output of said first flip-flop circuit, the signal input for receiving the output signal of said comparator circuit, and an output which delivers the output signal of said comparator circuit until the next resetting of the microprocessor.

8. A microprocessor according to claim 7, wherein said second means comprises:
a delay circuit;
a two-input AND logic gate having a first input connected to the output of said address decoder for selecting the register associated with said protection circuit, a second input connected through said delay circuit to the output of said second flip-flop circuit of said first means, and an output connected to the selection input of said associated register.

9. A microprocessor according to claim 8, wherein said delay circuit comprises a shift register synchronized with the operations for the selection of said associated register.

10. A microprocessor comprising:
an address bus;
a data bus;
a plurality of read and write accessible registers connected to said data bus;
an address decoder connected to said address bus for selecting said plurality of registers as a function of an address provided by said address bus; and
a plurality of protection circuits connected between said address decoder and said plurality of registers, each protection circuit associated with a register to secure access thereto by blocking selection of said register during write access operations after each resetting of the microprocessor, and releasing of said protection circuit by a successive sending on said data bus of N passwords proper to said register during N first operations for selection of said register with N≧1, the selection of said associated register being effective only for subsequent operations for the selection thereof until a next resetting of the microprocessor.

11. A microprocessor according to claim 10, wherein each protection circuit is connected between an output of said address decoder and a selection input of said associated register for selection thereof.

12. A microprocessor according to claim 10, wherein each protection circuit, during the N first operations for the selection of said associated register, compares N data elements present on said data bus with the N passwords proper to said associated register, and each protection circuit is released for subsequent operations of selection of said associated register until the next resetting of the microprocessor if the N data elements correspond to the N passwords.

13. A microprocessor according to claim 10, wherein a single password is provided for each register; and wherein each protection circuit comprises:
 a comparator circuit for comparing, during a first operation for the selection of said register, a data element present on said data bus with the password proper to said register and for delivery of an output signal representing a result of the comparison;
 first means for holding in each protection circuit the output signal until the next resetting of the microprocessor; and
 second means permitting the selection of said register for the subsequent selection operations of said register if the output signal indicates that the data present on said data bus during the first operation of selection of the register corresponds to the password associated with said register.

14. A microprocessor according to claim 12, wherein said first means comprises first and second D type flip-flop circuits, each flip-flop circuit having a clock input, a signal input, a resetting input to which a signal for resetting the microprocessor is applied, and an output;
 said first flip-flop circuit having the clock input connected to the output of the address decoder responsible for selecting said register associated with said protection circuit, and the signal input for receiving a signal corresponding to a logic signal; and
 said second flip-flop circuit having the clock input connected to the output of said first flip-flop circuit, the signal input for receiving the output signal of said comparator circuit, and an output which delivers the output signal of said comparator circuit until the next resetting of the microprocessor.

15. A microprocessor according to claim 14, wherein said second means comprises:
 a delay circuit;
 a first two-input AND logic gate having a first input connected to the output of said address decoder which has the task of selecting the register associated with said protection circuit, and a second input connected through said delay circuit to the output of said second flip-flop circuit of said first means;
 a second two-input AND logic gate having a first input connected to the output of said address decoder which has the task of selecting the register associated with said protection circuit, and a second input receiving a read/write signal; and
 an OR logic gate having a first input connected to an output of said first two-input AND logic gate, and a second input connected to an output of said second two-input AND logic gate, and an output connected to said register.

16. A microprocessor according to claim 15, wherein said delay circuit comprises a shift register synchronized with the operations for the selection of said associated register.

17. A microprocessor comprising:
 an address bus;
 a data bus;
 a plurality of read and write accessible registers connected to said data bus;
 an address decoder connected to said address bus for selecting said plurality of registers as a function of an address provided by said address bus; and
 a plurality of protection circuits connected between said address decoder and said plurality of registers;
 each protection circuit associated with a register to secure access thereto by blocking selection of said register after each resetting of the microprocessor, at least two passwords are provided to each register, and releasing of said protection circuit by a successive sending on said data bus of at least 2N passwords proper to said register during N first operations for selection of said register with N≧1, the selection of said associated register being effective only for subsequent operations for the selection thereof until a next resetting of the microprocessor.

18. A microprocessor according to claim 17, wherein the at least two passwords for said associated register are provided over said data bus in a predetermined order.

19. A microprocessor according to claim 17, wherein each protection circuit is arranged to block the selection of said associated register during read and write access operations to said associated register after each resetting of the microprocessor.

20. A microprocessor according to claim 17, wherein each protection circuit is arranged to block the selection of said associated register during write access operations to said associated register after each resetting of the microprocessor.

21. A microprocessor according to claim 17, wherein each protection circuit is connected between an output of said address decoder and a selection input of said associated register for selection thereof.

22. A microprocessor according to claim 17, wherein each protection circuit, during the N first operations for the selection of said associated register, compare at least 2N data elements present on said data bus with the at least 2N passwords proper to said associated register, and each protection circuit is released for subsequent operations of selection of said associated register up to the next resetting of the microprocessor if the at least 2N data elements correspond to the at least 2N passwords.

23. A microprocessor according to claim 17, wherein each protection circuit comprises:
 a first protection circuit portion comprising
  a first comparator circuit for comparing, during a first operation for the selection of said register, a data element present on said data bus with a first one the at least two passwords proper to said register and for delivery of an output signal representing a result of the comparison, and
  first means for holding in each protection circuit the output signal until the next resetting of the microprocessor; and
 a second protection circuit portion connected to an output of said first protection circuit portion and comprising
  a second comparator circuit for comparing, during the first operation for the selection of said register, the data element present on said data bus with a second one of the at least two passwords proper to said register and for delivery of an output signal representing a result of the comparison, second means for holding in each protection circuit the output signal until the next resetting of the microprocessor, and third means permitting the selection of said register for the subsequent selection operations of said register if the output signal indicates that the data present on said data bus during the first operation of selection thereof corresponds to the at least two passwords associated with said register.

24. A microprocessor according to claim 23, wherein said first means comprises first and second D type flip-flop circuits, each flip-flop circuit having a clock input, a signal input, a resetting input to which a signal for resetting the microprocessor is applied, and an output, said first flip-flop circuit having the clock input connected to the output of the address decoder responsible for selecting said register associated with said protection circuit, and the signal input for receiving a signal corresponding to a logic signal;

said second flip-flop circuit having the clock input connected to the output of said first flip-flop circuit, the signal input for receiving the output signal of said comparator circuit, and an signal output which delivers the output signal of said comparator circuit until the next resetting of the microprocessor; and a first delay circuit connected to the output of said second flip-flop circuit.

25. A microprocessor according to claim 24, wherein said second means comprises third and fourth D type flip-flop circuits, each flip-flop circuit having a clock input, a signal input, a resetting input to which a signal for resetting the microprocessor is applied, and an output;

said third flip-flop circuit having the clock input connected to the output of said first delay circuit for selecting said register associated with said protection circuit, and the signal input for receiving a signal corresponding to a logic signal; and said fourth flip-flop circuit having the clock input connected to the signal output of said third flip-flop circuit, the signal input for receiving the output signal of said comparator circuit, and an output which delivers the output signal of said comparator circuit until the next resetting of the microprocessor.

26. A microprocessor according to claim 25, wherein said third means comprises:

a second delay circuit; and a two-input AND logic gate having a first input connected to the output of said address decoder which has the task of selecting the register associated with said protection circuit, a second input connected through said second delay circuit to the output of said fourth flip-flop circuit of said first means, and an output connected to the selection input of said associated register.

27. A microprocessor according to claim 26, wherein said first and second delay circuits each comprises a shift register synchronized with the operations for the selection of said associated register.

28. A method for securing access to a plurality of registers of a microprocessor, the method comprising the steps of:

selecting one of said plurality of registers via an address decoder as a function of an address provided by an address bus connected to the address decoder;

blocking selection of the plurality of registers via a plurality of protection circuits after each resetting of the microprocessor; and releasing a protection circuit associated with a selected register by successive sending on the data bus N passwords proper to the selected register during N first operations for selection of the register with $N \geq 1$, the selection of the register being effective only for subsequent operations for the selection thereof until a next resetting of the microprocessor.

29. A method according to claim 28, wherein the step of blocking comprises blocking selection of a selected register during read and write access operations to that register after each resetting of the microprocessor.

30. A method according to claim 28, wherein the step of blocking comprises blocking selection of a selected register during write access operations to that register after each resetting of the microprocessor.

31. A method according to claim 28, wherein each protection circuit is connected between an output of the address decoder and a selection input of an associated register for selection thereof.

32. A method according to claim 28, wherein each protection circuit, during the N first operations for the selection of an associated register, compares N data elements present on the data bus with the N passwords proper to the associated register, and each protection circuit is released for subsequent operations of selection of the associated register until the next resetting of the microprocessor if the N data elements correspond to the N passwords.

33. A method according to claim 28, wherein a single password is provided for each register; and wherein the steps of blocking and releasing comprises:

comparing, during a first operation for the selection of the register, a data element present on the data bus with the password proper to the register and for delivery of an output signal representing a result of the comparison;

holding in each protection circuit the output signal until the next resetting of the microprocessor; and permitting the selection of the register for the subsequent selection operations of the register if the output signal indicates that the data present on the data bus during the first operation of selection of the register corresponds to the password associated with the register.

* * * * *

UNITED STATES PATENT AND TRADEMARK OFFICE
CERTIFICATE OF CORRECTION

PATENT NO. : 7,069,404 B1
APPLICATION NO. : 09/479105
DATED : June 27, 2006
INVENTOR(S) : Franck Roche Page 1 of 1

It is certified that error appears in the above-identified patent and that said Letters Patent is hereby corrected as shown below:

Column 7, Line 33    Delete: "claim 12"
                     Insert: --claim 13--

Column 8, Line 56    Delete: "one the"
                     Insert: --one of the--

Column 9, Line 27    Delete: "and an signal"
                     Insert: --and a signal--

Signed and Sealed this

Twentieth Day of February, 2007

JON W. DUDAS
*Director of the United States Patent and Trademark Office*